(12) United States Patent
Davidson et al.

(10) Patent No.: US 6,720,529 B2
(45) Date of Patent: Apr. 13, 2004

(54) AUTOTHREAD CONTROL FOR A WIRE FEEDER OF A WELDING SYSTEM

(75) Inventors: Robert R. Davidson, New London, WI (US); Kevin Summers, Appleton, WI (US)

(73) Assignee: Illinois Tool Works Inc., Glenview, IL (US)

( * ) Notice: Subject to any disclaimer, the term of this patent is extended or adjusted under 35 U.S.C. 154(b) by 0 days.

(21) Appl. No.: 10/235,590

(22) Filed: Sep. 5, 2002

(65) Prior Publication Data

US 2004/0045946 A1 Mar. 11, 2004

(51) Int. Cl.$^7$ ............................................... B23K 9/133
(52) U.S. Cl. ............................... 219/137.71; 219/125.1; 901/42
(58) Field of Search ........................ 219/137.71, 125.1, 219/137.7; 901/42

(56) References Cited

U.S. PATENT DOCUMENTS 5,512,726 A * 4/1996 Arantes et al. .......... 219/125.1
6,066,833 A   5/2000 Rigdon et al.
6,286,748 B1  9/2001 Cooper

OTHER PUBLICATIONS

Auto Invision II Owner's Manual, Miller Electric Mfg. Co., OM–201 396F, Apr. 2002, Appleton, WI.

* cited by examiner

Primary Examiner—Clifford C. Shaw
(74) Attorney, Agent, or Firm—Ziolkowski Patent Solutions Group, LLC

(57) ABSTRACT

The present invention is directed to a control that upon detection of an autothread input determines the amount of time in which a motor of a drive assembly should be activated so as to precisely supply an initial segment of wire to a welding gun of a welding system. The control determines the requisite time necessary to precisely thread the welding wire based on a wire feed speed and gun length. The gun length and wire feed speed may be determined from a series of user inputs or read from memory. By limiting user involvement with the actual "feeding" of wire to the welding gun, a more precise segment of welding wire may be fed to the welding gun such that trimming of wire extending past the tip of the welding gun is not needed.

20 Claims, 4 Drawing Sheets

AUTOTHREAD CONTROL FOR A WIRE FEEDER OF A WELDING SYSTEM

BACKGROUND OF THE INVENTION

The present invention relates generally to welding systems and, more particularly, to an apparatus for autothreading welding wire from a welding wire supply source through a welding gun of a welding system.

Welding systems and, in particular, automatic or robotic welders are well suited for high output industrial applications such as those more commonly found in machine shops and automobile manufacturing facilities. As such, considerable amounts of wire are consumed during the welding process often resulting in "down time" for re-supplying wire from a wire source to the robotic arm of the automated welding system.

When the supply of welding wire being supplied to the welding system is depleted, the welder or operator of the system typically will first grasp the end of the welding wire protruding from the tip of the welding gun with a pair of pliers and pull out any welding wire remaining in or extending from the gun. Thereafter, the operator will replace the empty welding wire spool and replace it with a new spool of welding wire. The loose end of the new spool of welding wire is then threaded through various guides and conduits extending to a wire feeder assembly whereupon the welding wire is driven by a drive assembly so as to thread the wire through the welding gun until the welding wire exits the gun tip. Typically, excess welding wire extends past the gun tip as a result of over-threading which must be manually trimmed, or in the case of a robot welding process, an automatic cutter may be implemented. Thereafter, the welding system is ready to resume the welding process.

A number of systems have been developed to reduce the aforementioned down-time associated with manually feeding wire from a new supply to the welding gun by implementing an apparatus that automatically connects the welding system to a fresh wire supply source upon depletion of welding wire on the current supply. However, these systems for automatically connecting to a fresh wire supply as well as the aforementioned manual feed systems require the welder or operator of the welding system to control the initial feeding of wire from the wire supply to the tip of the welding gun. This manual control of the initial feeding of wire from the supply to the tip of the welding gun customarily requires the welder to depress or hold a jog button on a welding system interface until the wire is fed from the wire supply to the tip of the gun. As a result, the welder would typically over depress the jog button thereby resulting in wire being fed past the tip of the welding gun. This "overshooting" of the gun tip then requires the welder to either retract or trim the wire. Electing to trim the excess wire then results in unused welding wire being discarded as waste thereby resulting in higher wire consumption and costs. Retracting the wire is also problematic as the welder must then depress a retract button for the appropriate time so as to not retract the wire past the gun tip. This repetitive depressing of the jog and retract buttons to achieve proper placement of the welding wire in the gun is time consuming and results in unnecessary and unwanted down time for the welding system thereby leading to manufacturing delays and increased manufacturing costs.

It is therefore desirable to design a system whereupon a precise amount of welding wire is fed to the gun of a welding system such that the wire need not be trimmed thereby reducing wire waste and operational delays.

BRIEF DESCRIPTION OF THE INVENTION

The present invention is directed to an autothread wire feeding system overcoming the aforementioned drawbacks. Specifically, the present invention is directed to a control that upon detection of an autothread input determines the amount of time in which a motor of a wire feed drive assembly should be activated so as to precisely supply an initial segment of wire to a welding gun of a welding system. The control which may be implemented as software, hardware, or a combination of both determines the requisite time necessary to precisely thread the welding wire based on the wire feed speed and gun length of the system. The gun length and wire feed speed may be determined from a series of user inputs or read from memory stored on a storage device in the welding system. By limiting user involvement with the actual "feeding" of wire to the welding gun, a more precise segment of welding wire may be fed to the welding gun such that trimming of wire extending past the tip of the welding gun is not needed. The present invention may also be implemented as a testing tool to confirm proper feeding of wire from the wire supply to the welding gun.

Therefore, in accordance with one aspect of the present invention, a control operable with a wire feeder of a welding system is provided and configured to receive an autothread input from a user. The control is also configured to determine a time required for welding wire to thread through a prescribed length at a prescribed wire feed speed. The control is further configured to activate a motor configured to drive welding wire from a wire source at the prescribed wire feed speed and for the determined time until a segment of welding wire having the prescribed length is fed.

In accordance with another aspect of the present invention, a power source/interface unit configured to drive a wire drive assembly is provided. The power source/interface unit includes a robot control receptacle configured to communicate with a robot controller as well as a peripheral control configured to communicate with a drive assembly of a welding robot having a welding gun. The interface further includes a processor configured to execute a set of instructions that when executed causes the processor to receive an autothread user input and determine from a set of wire feed inputs a motor control signal. The motor control signal is configured to drive the drive assembly to minimally thread wire through the welding robot to the tip of the welding gun. The processor is further caused to output the motor control signal to the drive assembly.

In accordance with yet another aspect of the present invention, a computer readable storage medium having a computer program stored thereon and representing a set of instructions that when executed by a computer causes the computer to detect an autothread command on an interface of a welding system is provided. The set of instructions further causes the computer to access a plurality of wire feeding parameters and determine a threading time therefrom. The computer program then causes the computer to activate a motor of a drive assembly of a welding gun for the threading time to supply a segment of wire to the welding gun.

Various other features, objects and advantages of the present invention will be made apparent from the following detailed description and the drawings.

BRIEF DESCRIPTION OF THE DRAWINGS

The drawings illustrate one preferred embodiment presently contemplated for carrying out the invention.

In the drawings.

DETAILED DESCRIPTION OF THE PREFERRED EMBODIMENT

The present invention will be described with respect to an automated or robotic welding system such as those marketed by Miller Electric Manufacturing Company, Inc. of Appleton, Wis., but the present invention may be equivalently applicable to other welding systems including non-automated or non-robotic welding apparatuses.

Figure 1:
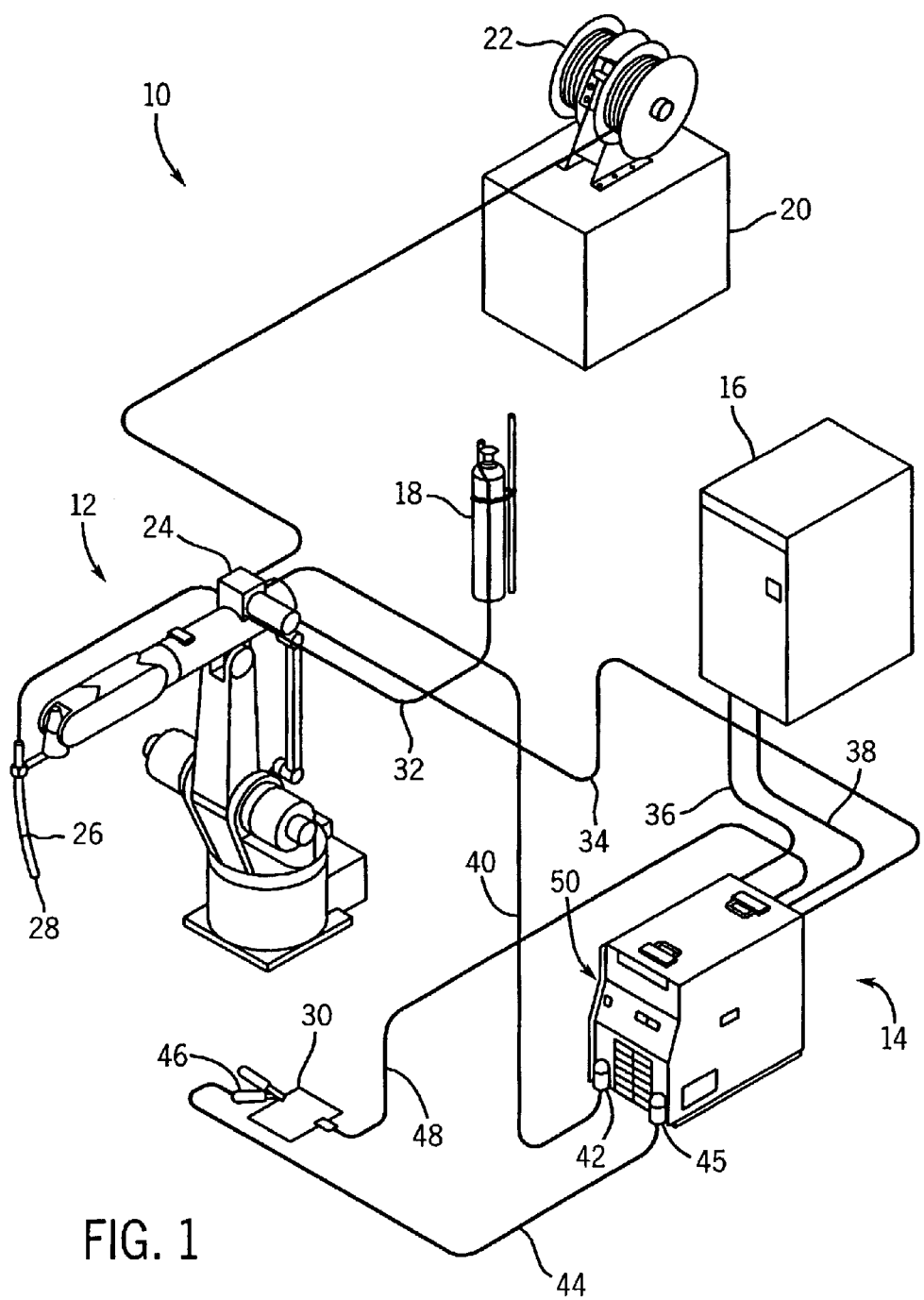
FIG. 1 is a perspective view of an automated or robotic welding system.

Referring to FIG. 1, an automated welding system 10 includes a robotic arm 12, a power source/interface unit 14, and a robot control 16. A gas cylinder 18 is also provided to supply shielding gas for the welding process. Welding system 10 is particularly applicable for MIG welding, pulsed MIG welding, and flux cored welding for high output and/or industrial welding environments such as those more commonly encountered in automobile manufacturing facilities.

The welding system further includes a wire supply source 20 having a spool of welding wire 22 that is supplied to the weld by a drive assembly 24 positioned on or adjacent to welding gun 12. The drive assembly 24 drives wire from the spool 22 through the internal conduits of the welding gun 12 whereupon the welding wire is deposited into the weld through a welding gun 26. Specifically, when the tip 28 of welding gun 26 is positioned proximate to workpiece 30, the welding wire comes into contact with the grounded workpiece such that an electrical current passes through the welding wire to the workpiece causing the welding wire to be heated and melt. As a result, an electrical arc is established which causes the welding wire to continue to melt as well as transfer the melted welding wire to the workpiece where the welding wire fuses and cools with the workpiece. Because the electrical energy supplied to the welding system is typically greater than that required to melt the welding wire, most of the remaining energy is in the form of heat which is transferred to the surface of the workpiece resulting in the workpiece also melting resulting in an improved bonding between the melted welding wire and the workpiece. As the welding gun is translated across the workpiece, melted welding wire is continuously transferred to the workpiece 30 as long as welding wire is available. If the welding process requires a shielding gas, gas is provided to the robot 12 and welding gun 26 from the gas cylinder 18 via conduit 32.

Drive assembly 24 is electrically connected to the power source/interface unit 14 via cable 34 whereby driving control signals are transmitted from the interface 14 to the drive assembly 24. Alternately, the power source/interface unit 14 could wirelessly transmit and receive control signals to and from the drive assembly. Also connected to the power source/interface unit 14 is robot control 16 via robot input/output cable 36. Alternately, the robot control could wirelessly communicate with the power source/interface unit 14 via a wireless control (not shown). Optionally connected between the robot control 16 and the system interface 14 is a remote program select cable 38. A positive weld cable 40 is connected from a positive terminal 42 of the interface 14 to the robot 12 and a negative weld cable 44 extends from a negative terminal 45 of the system interface 14 to a clamping member 46 designed to securely hold workpiece 30. To provide feedback to the power source/interface unit 14, a voltage sensing lead 48 is also provided and connected between the power source/interface unit 14 and workpiece 30. As will be described in greater detail below, power source/interface unit 14 includes a number of controls 50 that effectuate operation of the welding process including autothreading an initial segment of wire through the robot from a wire supply to the tip of the welding gun.

Figure 2:
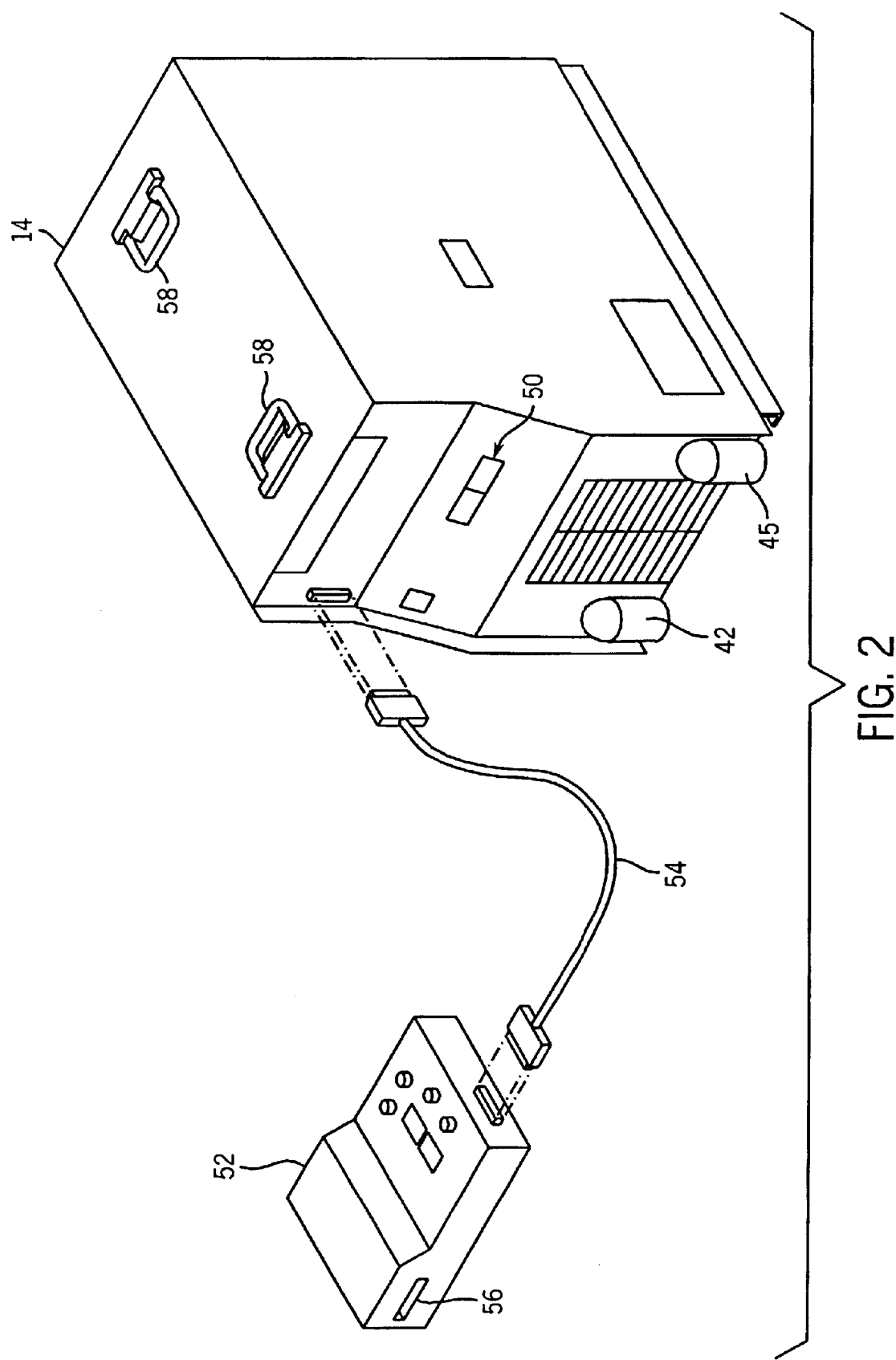
FIG. 2 is a perspective view of a welding power source having a set-up pendant connected thereto.

Referring now to FIG. 2, to facilitate a completely automated welding environment, computer programs and/or control algorithms may be uploaded to the power source/interface unit 14 using a set-up pendant 52. The computer programs could also be updated using a wireless platform. By connecting the set-up pendant 52 to the welding source 14 using an interconnecting cord 54, an internal controller or processor within the power source/interface unit 14 may be programmed to regulate the welding process. For example, information such as a wire feed speed or a particular gun length may be uploaded to the power source/interface unit 14 so that that information may be considered when providing control signals to the drive assembly as will be described in greater detail below. Set-up pendant 52 is designed to upload computer programs or machine controls directly or from a computer readable storage medium such as a PC card or a floppy disk and, as such, a card slot or floppy disk bay 56 is provided. It should be noted that power source/interface unit 14 may also include one or more handles 58 to assist with transporting of the unit.

Figure 3:
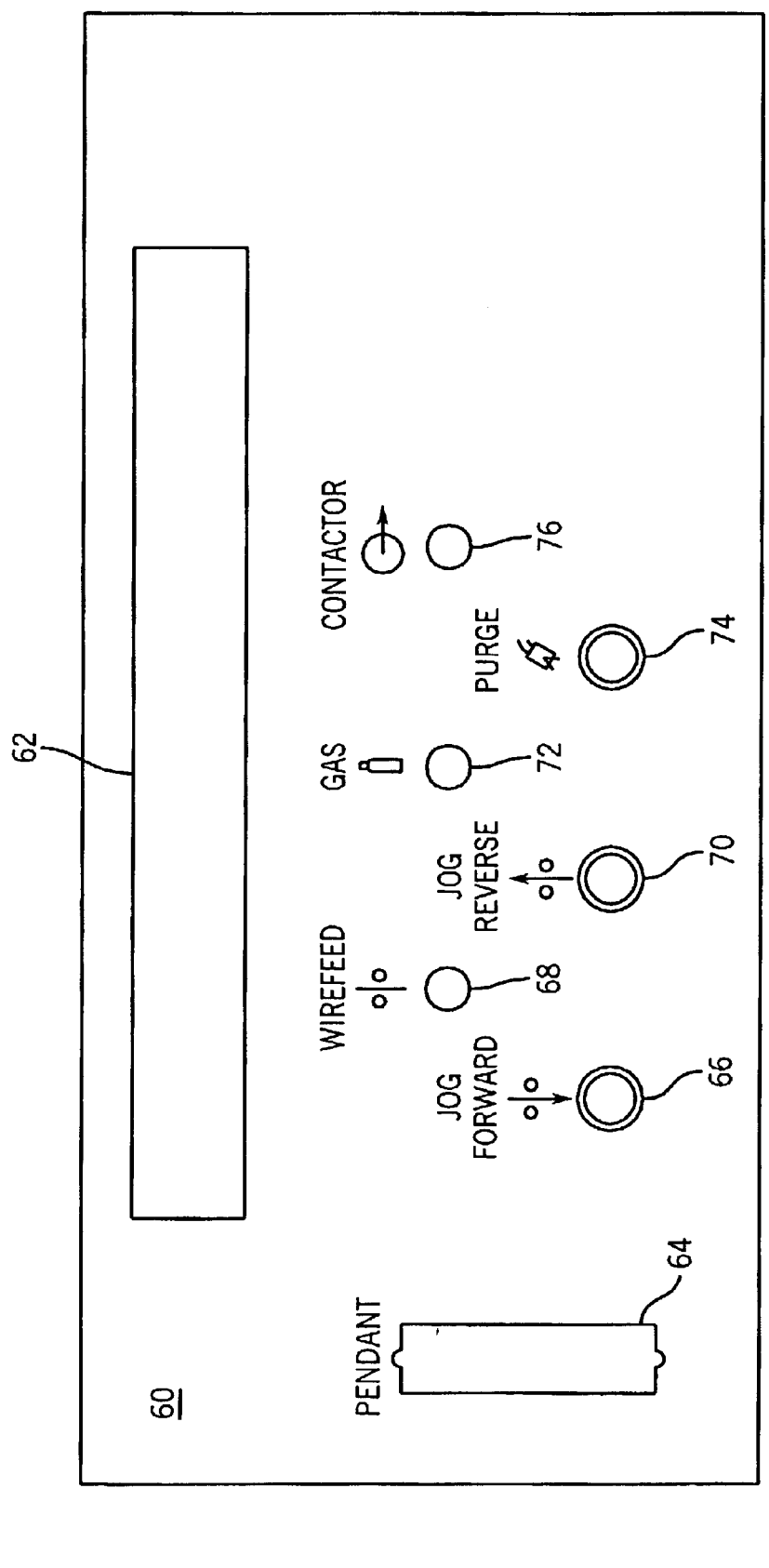
FIG. 3 is a front elevational view of a portion of the welding power source shown in FIGS. 1 and 2.

Referring now to FIG. 3, a front elevational view of a portion of the power source/interface unit is shown. Specifically, a front panel 60 includes a main display 62 which displays system state information, an active program, error messages, weld parameters at idle and during welding, and the like. Controls 50 are also positioned within the front panel 60 and include a pendant receptacle 64 configured to receive one end of an interconnecting cord connecting the interface to the set-up pendant as was described with respect to FIG. 2. A jog forward push button 66 is provided and when depressed by an operator advances wire from the wire supply through the welding gun for ultimate introduction of wire to the weld. A wire feed indicator LED 68 is also provided and lights when the wire feeder drive assembly motor is energized. To enable the operator to retract wire from the welding gun, a jog reverse push button 70 is provided. A gas indicator LED 72 is also provided and lights when the gas solenoid is energized. A purge push button 94 is also provided and momentarily energizes the gas solenoid to purge air from the shielding gas line or to adjust a shielding gas regulator. Also displayed on the front panel 60 is a contactor indicator LED 76 that lights when the welding power source contactor is energized. As will be discussed in greater detail with respect to FIG. 4, simultaneous activation of the jog forward push button 66 and the jog reverse push button 70 is indicative of an autothread command indicating a desire for the welding system to thread welding wire from the welding wire supply to the tip of the welding gun automatically at a prescribed wire feed speed and a determined time.

Figure 4:
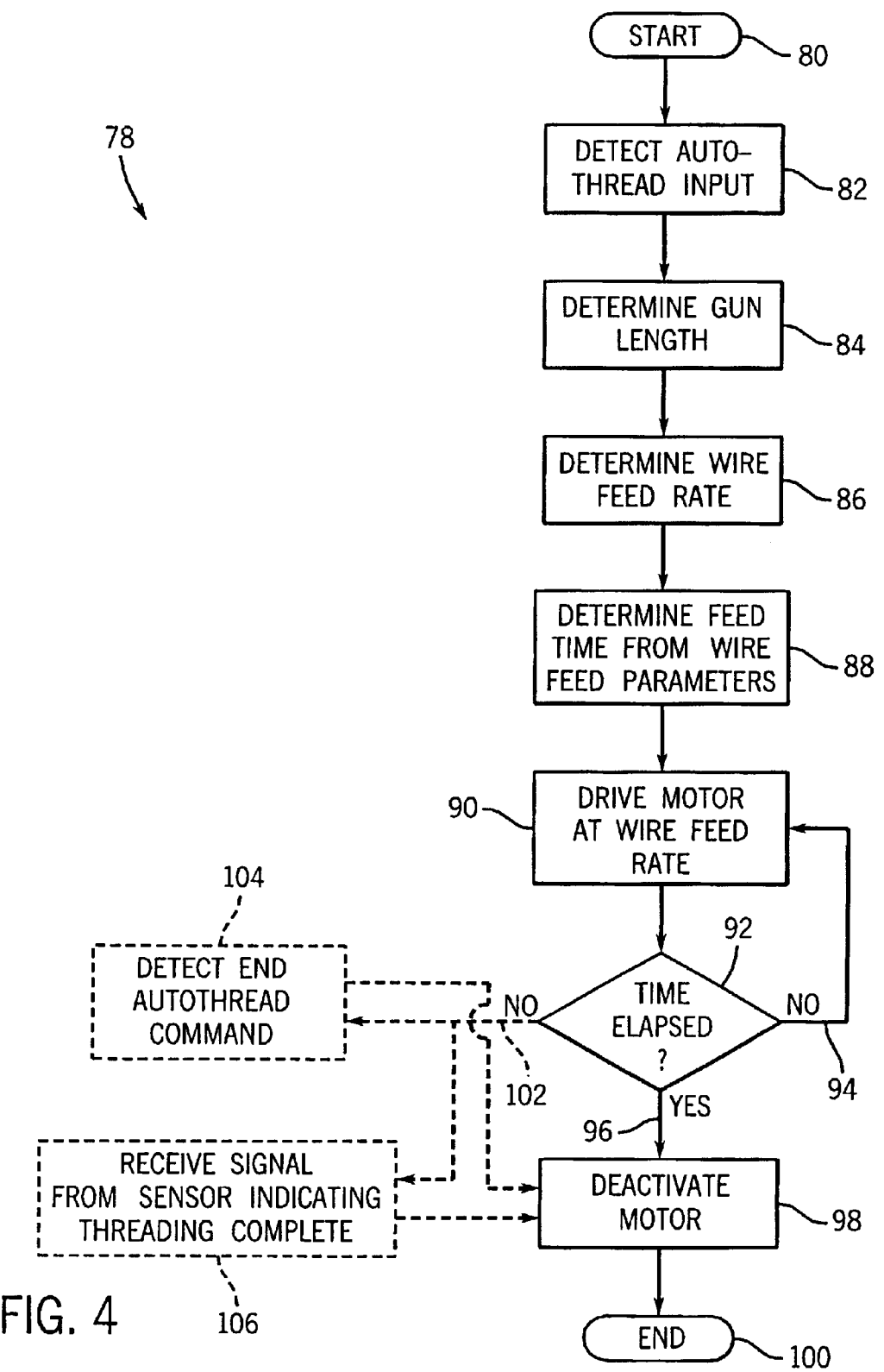
FIG. 4 is a flow chart setting forth the steps of a process for autothreading wire from a wire supply to a welding gun of a welding system in accordance with the present invention and that can be used in a software implementation of the invention.

Referring now to FIG. 4, an autothread process 78 for threading an initial segment of welding wire from a wire supply to the tip of the welding gun will be described in greater detail. The steps of the autothread process may be implemented as a set of instructions for a computer program or hardware, or a combination thereof. In prior threading processes, a user was required to depress a jog forward push button and manually oversee the threading of welding wire from the welding wire supply to the tip of the welding gun. As a result, oftentimes the welding wire would be thread past the tip of the welding gun thereby requiring either retraction of the welding wire back through the welding gun which can result in a "bird's nest" or require trimming of the excess welding wire thereby resulting in waste. Process 78 avoids these drawbacks by precisely threading a segment of welding wire through the welding gun from the welding wire supply to the tip of the welding gun so that trimming of any excess wire is not necessary nor is retraction of wire.

The autothread process 78 begins at 80 with the operator taking the steps necessary to rethread welding wire from a wire supply to the welding gun. Thereafter, the operator depresses an autothread button or an equivalent thereof such as simultaneous depressing of the jog forward and the jog reverse buttons 82. Responsive thereto, the process 78 determines a gun length or distance from the welding wire supply to the tip of the welding gun 84. This length may be determined from a user input or read from memory. Alternatively, a desired wire length could be input or read rather than the distance between the gun tip and the wire supply. A wire feed rate is then determined at 86. These values, which constitute wire feed parameters, may also be read from memory rather than detected as a user input. For example, the gun length or desired wire length as well as the desired wire feed rate may be stored on a card that is read by a set-up pendant and then used to program the controller of the power source/interface unit. Regardless of the source of the wire feed parameters, a feed time is determined at 88. The feed time equates to the time necessary for the drive assembly to supply or translate welding wire from the wire supply to the tip of the welding gun having the length identified by the user or read from memory and at the wire feed rate input by the user or read from memory.

Once the feed time necessary to thread the welding wire from the supply to the tip of the welding gun is determined, a signal is then transmitted from the power source/interface unit 14 to the motor of the drive assembly instructing the drive motor to begin driving welding wire from the wire supply through the welding gun toward the tip of the welding gun at the prescribed wire feed rate 90. The system interface then continuously monitors to determine if the feed time determined at 88 has elapsed 92. If not 94, the drive assembly motor continues to translate welding wire from the wire supply to the welding gun. If the time has elapsed 92, 96, the power source/interface unit 14 transmits a deactivation signal to the drive assembly motor causing the motor to deactivate thereby ceasing the driving of welding wire from the wire supply to the welding gun 98. As the time has now elapsed 92, 96 and the drive assembly motor has deactivated 98, process 78 ends at 100.

In addition to monitoring the determined feed time, process 78 further includes, in one alternate embodiment, the detection of an end autothread command 104 if the time has not elapsed 92, 102, as indicative of a user override command. That is, despite the time determined by the power source/interface unit not having elapsed, the welder may input an end autothread command at 104 overriding the system. In another alternate. Embodiment, a sensor positioned proximate to the tip of the welding gun provides a feedback signal to the power source/interface unit at 106 indicating that welding wire has, in fact, been translated through the welding gun and past the gun tip. Accordingly, if an end autothread command 104 or a signal from the sensor indicating that threading has been received by the power source/interface unit the power source/interface unit will transmit a deactivation signal to the motor at 98. Subsequently, as previously described, the autothread process ends at 100.

The present invention also contemplates a mechanism wherein the welder may pause the autothread process by depressing a pause button or a series of buttons equivalent thereto. As a result, the autothreading process is paused as opposed to being reset if an end autothread command is detected.

Not only may the aforementioned process be used to precisely thread an initial segment of welding wire from a wire supply to the tip of the welding gun, the present invention may also be implemented as a testing tool for testing the wire feed system of the welding apparatus. As such, the present invention allows the user to "rule out" a wire feed problem with a push of a button and without a watch or measuring tape. For example, if an issue appears that the user suspects is a wire feeding problem, the user may reload the welding wire from the motor to the tip of the welding gun and then check to see if the correct amount of welding wire is translated to the tip of the welding gun. Alternatively, the user could feed the welding wire from the end of the gun and compare to the gun length to determine if, in fact, the drive assembly motor has translated a segment of welding wire equivalent to the length of the welding gun. The present invention also allows the user to determine based on the measuring of two separate segments of welding wire if the drive assembly motor is consistently driving welding wire from the wire supply to the tip of the gun.

The present invention is also applicable for those welding operations wherein the user desires to limit the total output of welding wire by the welding gun to the workpiece. That is, the user may input a desired wire length as well as a desired or prescribed wire feed speed and then depress an autothread button or a series of buttons equivalent thereto thereby causing the power source/interface unit to determine the requisite time necessary to feed the desired length of welding wire at the prescribed wire feed speed and translate a corresponding drive signal to the drive assembly motor. As such, in a fully automated welding environment, the amount of welding wire introduced to the weld may be more precisely controlled.

Therefore, in accordance with one embodiment of the present invention, a control operable with a wire feeder of a welding system is provided and configured to receive an autothread input from a user. The control is also configured to determine a time required for welding wire to thread through a prescribed length at a prescribed wire feed speed. The control is further configured to activate a motor configured to drive welding wire from a wire source at the prescribed wire feed speed and for the determined time until a segment of welding wire having the prescribed length is fed.

In accordance with another embodiment of the present invention, a power source/interface unit configured to drive a wire drive assembly is provided. The power source/interface unit includes a robot control receptacle configured to communicate with a robot controller as well as a peripheral control configured to communicate with a drive assembly of a welding robot having a welding gun. The interface further includes a processor configured to execute a set of instructions that when executed causes the processor to receive an autothread user input and determine from a set of wire feed inputs a motor control signal. The motor control signal is configured to drive the drive assembly to minimally thread wire through the welding robot to the welding gun. The processor is further caused to output the motor control signal to the drive assembly.

In accordance with yet another embodiment of the present invention, a computer readable storage medium having a computer program stored thereon and representing a set of instructions that when executed by a computer causes the computer to detect an autothread command on an interface of a welding system is provided. The set of instructions further causes the computer to access a plurality of wire feeding parameters and determine a threading time therefrom. The computer program then causes the computer to activate a motor of a drive assembly of a welding gun for the threading time to supply a segment of wire to the welding gun.

The present invention has been described in terms of the preferred embodiment, and it is recognized that equivalents, alternatives, and modifications, aside from those expressly stated, are possible and within the scope of the appending claims.

What is claimed is:

1. A control operable with a wire feeder of a welding system, the control configured to:
   receive an autothread input from a user;
   determine a time required for welding wire to thread a prescribed length at a prescribed wire feed speed; and
   activate a motor configured to drive welding wire from a wire source at the prescribed wire feed speed and for the determined time until a segment of welding wire having the prescribed length is fed.

2. The control of claim 1 wherein the prescribed length is a length of a welding gun of the welding system and further configured to receive a signal from a sensor on the welding gun indicating that the segment of the wire has been threaded through the welding gun.

3. The control of claim 1 wherein the prescribed length is a length of a welding gun of the welding system and wherein the segment of welding wire when threaded through the welding gun has a length defined by a distance between an output end of the welding gun and the wire source.

4. The control of claim 1 further configured to receive the autothread input upon simultaneous user activation of a jog button and a retract button of the welding system.

5. The control of claim 1 further configured to deactivate the motor once the time has elapsed.

6. The control of claim 1 further configured to re-determine the time if the prescribed wire feed speed is reset.

7. The control of claim 1 further configured to receive user input identifying a gun length and the prescribed wire feed speed, and determine the time required for the welding wire to be thread through a welding gun based on the gun length and the prescribed wire feed speed.

8. A power source/interface unit configured to drive a wire drive assembly, the power source/interface unit comprising:
   a robot control configured to communicate with a robot controller;
   a peripheral control configured to communicate with a drive assembly of a welding robot having a welding gun; and
   a processor configured to execute a set of instructions that when executed causes the processor to:
   receive an autothread user input;
   determine from a set of wire feed inputs a motor control signal configured to drive the drive assembly to minimally thread wire through the welding robot to the welding gun; and
   output the motor control signal to the drive assembly.

9. The power source/interface unit of claim 8 further comprising a jog forward control and a jog reverse control and wherein the processor is further configured to detect a user simultaneous activation of the job forward control and the jog reverse control as indication of the autothread user input.

10. The power source/interface unit of claim 8 wherein the processor is further configured to determine a wire feed time signal and output the wire feed time signal to the motor, the wire feed time signal configured to drive the motor for a prescribed time as determined by the processor.

11. The power source/interface unit of claim 10 wherein the processor is further configured to determine the prescribed time from user input identifying wire feed speed and welding gun length.

12. A computer readable storage medium having a computer program stored thereon and representing a set of instructions that when executed by a computer causes the computer to:
   detect an autothread command on an interface of a welding system;
   access a plurality of wire feeding parameters;
   determine a threading time from the plurality of wire feeding parameters; and
   activate a motor of a drive assembly of a welding gun for the threading time to supply a segment of wire to the welding gun.

13. The computer readable storage medium of claim 12 wherein the set of instructions further causes the computer to read the plurality of wire feeding parameters from a database stored in memory on the welding system.

14. The computer readable storage medium of claim 13 wherein the plurality of wire feeding parameters includes welding gun length and desired wire feed speed.

15. The computer readable storage medium of claim 12 wherein the autothread command is defined by a simultaneous activation by a user of a jog forward control and a jog reverse control on the welding system.

16. The computer readable storage medium of claim 12 incorporated into a software package for uploading to a computer-based controller of the welding system.

17. The computer readable storage medium of claim 12 incorporated into a computer data signal downloadable to a computer-based controller of the welding system.

18. The computer readable storage medium of claim 12 incorporated into a data card readable by a card reader connectable to the welding system, the card reader having a controller configured to regulate operation of the welding system.

19. The computer readable storage medium of claim 12 wherein the set of instructions further causes the computer to access the plurality of wire feeding parameters from a series of user inputs.

20. The computer readable storage medium of claim 12 wherein the set of instructions further causes the computer to activate the motor for the threading time so as to thread a minimal segment of wire feed to the welding gun, the minimal segment of wire feed defined as a length of wire feed necessary to fully thread wire feed through the welding gun without needing trimming of the wire feed at an output end of the welding gun.

* * * * *

UNITED STATES PATENT AND TRADEMARK OFFICE
CERTIFICATE OF CORRECTION

PATENT NO. : 6,720,529 B2 Page 1 of 1
APPLICATION NO. : 10/235590
DATED : April 13, 2004
INVENTOR(S) : Davidson et al.

It is certified that error appears in the above-identified patent and that said Letters Patent is hereby corrected as shown below:

Col. 5, line 64, delete "In another alternate. Embodiment," and substitute therefor -- In another alternate embodiment, --.

Signed and Sealed this

Twenty-ninth Day of January, 2008

JON W. DUDAS
*Director of the United States Patent and Trademark Office*